US010909230B2

(12) United States Patent
Vilke et al.

(10) Patent No.: US 10,909,230 B2
(45) Date of Patent: Feb. 2, 2021

(54) METHODS FOR USER AUTHENTICATION

(71) Applicant: Stephen D Vilke, Bainbridge Island, WA (US)

(72) Inventors: Stephen D Vilke, Bainbridge Island, WA (US); James Selvidge, Berkeley, CA (US)

(73) Assignee: Stephen D Vilke, Bainbridge Island, WA (US)

( * ) Notice: Subject to any disclaimer, the term of this patent is extended or adjusted under 35 U.S.C. 154(b) by 232 days.

(21) Appl. No.: 15/622,057

(22) Filed: Jun. 13, 2017

(65) Prior Publication Data
US 2017/0364675 A1 Dec. 21, 2017

Related U.S. Application Data

(60) Provisional application No. 62/350,657, filed on Jun. 15, 2016.

(51) Int. Cl.
G06F 7/04 (2006.01)
G06F 15/16 (2006.01)
H04L 29/06 (2006.01)
G06F 21/36 (2013.01)
H04L 9/32 (2006.01)
G09C 1/00 (2006.01)

(52) U.S. Cl.
CPC .............. *G06F 21/36* (2013.01); *G09C 1/00* (2013.01); *H04L 9/3226* (2013.01)

(58) Field of Classification Search
CPC .......... G06F 21/36; G09C 1/00; H04L 9/3226
See application file for complete search history.

(56) References Cited

U.S. PATENT DOCUMENTS

| 8,196,198 | B1 * | 6/2012 | Eger | G06F 21/36 |
| | | | | 726/21 |
| 8,621,578 | B1 * | 12/2013 | Blomquist | H04L 63/0861 |
| | | | | 726/5 |
| 8,881,251 | B1 * | 11/2014 | Hilger | G06F 21/31 |
| | | | | 726/7 |
| 9,027,099 | B1 * | 5/2015 | Saylor | H04W 12/06 |
| | | | | 726/6 |
| 9,202,105 | B1 * | 12/2015 | Wang | G06F 21/32 |
| 9,219,720 | B1 * | 12/2015 | Satpathy | H04L 63/08 |
| 9,235,715 | B1 * | 1/2016 | Bailey | H04W 12/0609 |
| 2003/0177366 | A1 * | 9/2003 | de Jong | G06F 21/34 |
| | | | | 713/184 |
| 2007/0214354 | A1 * | 9/2007 | Renaud | G06F 21/31 |
| | | | | 713/155 |

(Continued)

*Primary Examiner* — Darshan I Dhruv
(74) *Attorney, Agent, or Firm* — Penilla IP, APC

(57) ABSTRACT

Methods and systems for authenticating a user include presenting a list of themes on a user interface of a client device for user selection. Images of a plurality of objects and query prompts are presented on a client device for a theme selected from the list. Images of objects selected in response to the query prompts are received and verified to determine that the objects that are selected are theme-based objects and correspond to the query prompts. The selected objects are stored as answers to the query prompts identified for the theme and are used for authenticating the user during subsequent requests received from an application that is used to access a sensitive, digital asset.

20 Claims, 9 Drawing Sheets

(56) References Cited

U.S. PATENT DOCUMENTS

| | | | |
|---|---|---|---|
| 2007/0261109 A1* | 11/2007 | Renaud | G06F 21/31 726/6 |
| 2007/0271466 A1* | 11/2007 | Mak | G06F 21/316 713/184 |
| 2009/0328175 A1* | 12/2009 | Shuster | G06F 21/36 726/7 |
| 2009/0328197 A1* | 12/2009 | Newell | G06F 21/36 726/18 |
| 2010/0043062 A1* | 2/2010 | Alexander | G06F 21/36 726/6 |
| 2010/0058437 A1* | 3/2010 | Liew | G06F 21/36 726/2 |
| 2010/0325706 A1* | 12/2010 | Hachey | G06F 21/36 726/6 |
| 2011/0202982 A1* | 8/2011 | Alexander | G06F 21/36 726/7 |
| 2011/0225640 A1* | 9/2011 | Ganapathy | H04L 63/0281 726/8 |
| 2012/0323788 A1* | 12/2012 | Keresman, III | G07F 7/10 705/44 |
| 2013/0014248 A1* | 1/2013 | McLaughlin | G06F 3/04883 726/17 |
| 2013/0138968 A1* | 5/2013 | Yudkin | G06F 21/602 713/183 |
| 2013/0269013 A1* | 10/2013 | Parry | H04L 63/0428 726/7 |
| 2013/0305321 A1* | 11/2013 | Saxena | H04L 63/102 726/4 |
| 2013/0347087 A1* | 12/2013 | Smith | G06F 21/36 726/7 |
| 2014/0189835 A1* | 7/2014 | Umerley | G06F 21/40 726/7 |
| 2014/0359653 A1* | 12/2014 | Thorpe | G06F 21/36 725/30 |
| 2014/0372754 A1* | 12/2014 | Aissi | H04L 9/0861 713/168 |
| 2015/0135289 A1* | 5/2015 | Hosabettu | G06F 21/36 726/6 |
| 2015/0161613 A1* | 6/2015 | Zhang | G06Q 30/0226 705/14.23 |
| 2015/0178490 A1* | 6/2015 | Tamboly | G06F 21/46 726/4 |
| 2015/0235018 A1* | 8/2015 | Gupta | G06F 21/36 726/19 |
| 2015/0319153 A1* | 11/2015 | Tartz | H04L 63/08 726/4 |
| 2017/0061115 A1* | 3/2017 | Kalra | G06F 21/36 |
| 2017/0099602 A1* | 4/2017 | Joo | H04W 12/0804 |
| 2017/0126879 A1* | 5/2017 | Krishna | G06F 21/36 |
| 2017/0346817 A1* | 11/2017 | Gordon | G02B 27/0172 |
| 2017/0357793 A1* | 12/2017 | Nasrallah | G06F 3/04817 |
| 2018/0048641 A1* | 2/2018 | Zheng | H04L 63/0846 |
| 2019/0095605 A1* | 3/2019 | Gupta | G06F 21/36 |

\* cited by examiner

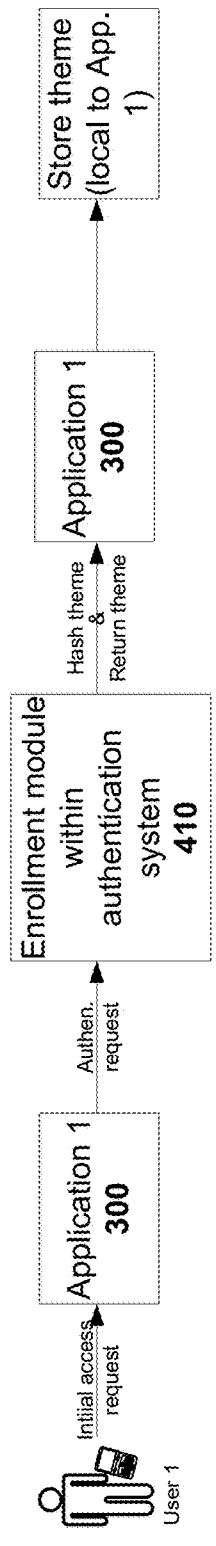
Figure 2-1
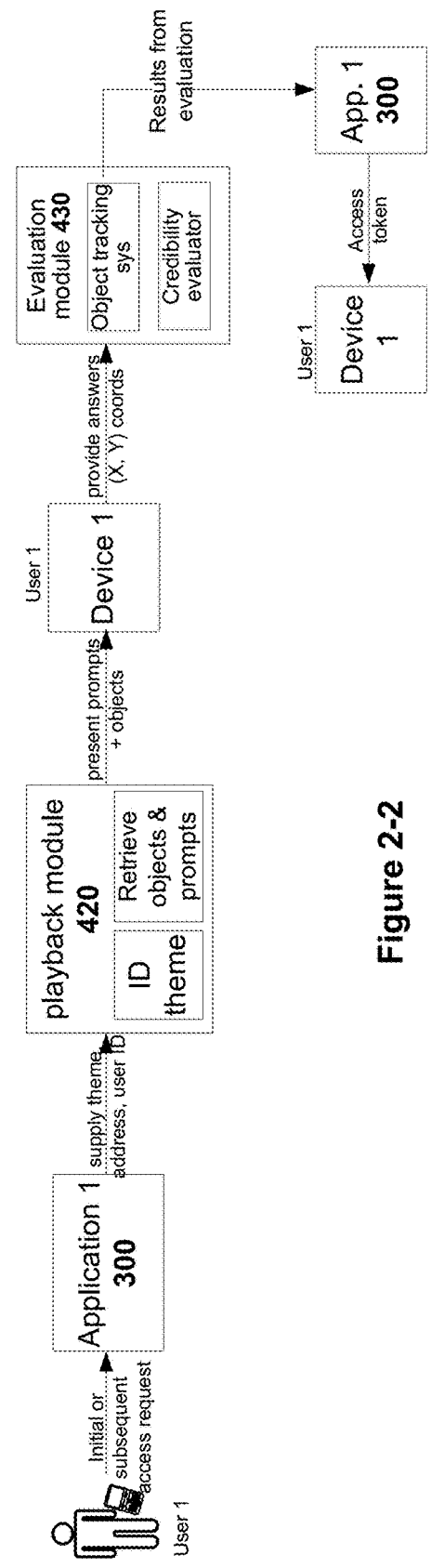
Figure 2-2
Figure 2

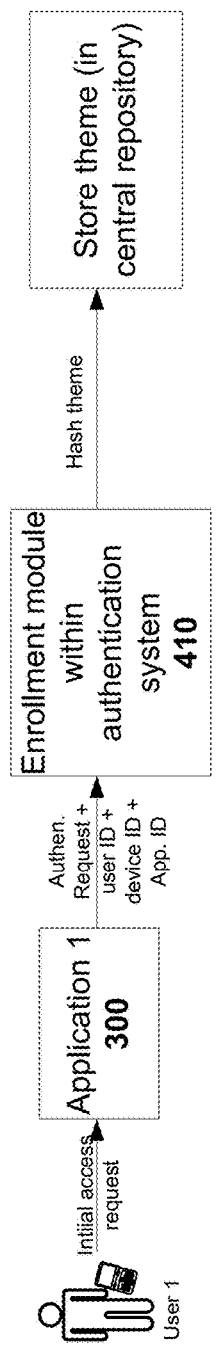
Figure 3-1
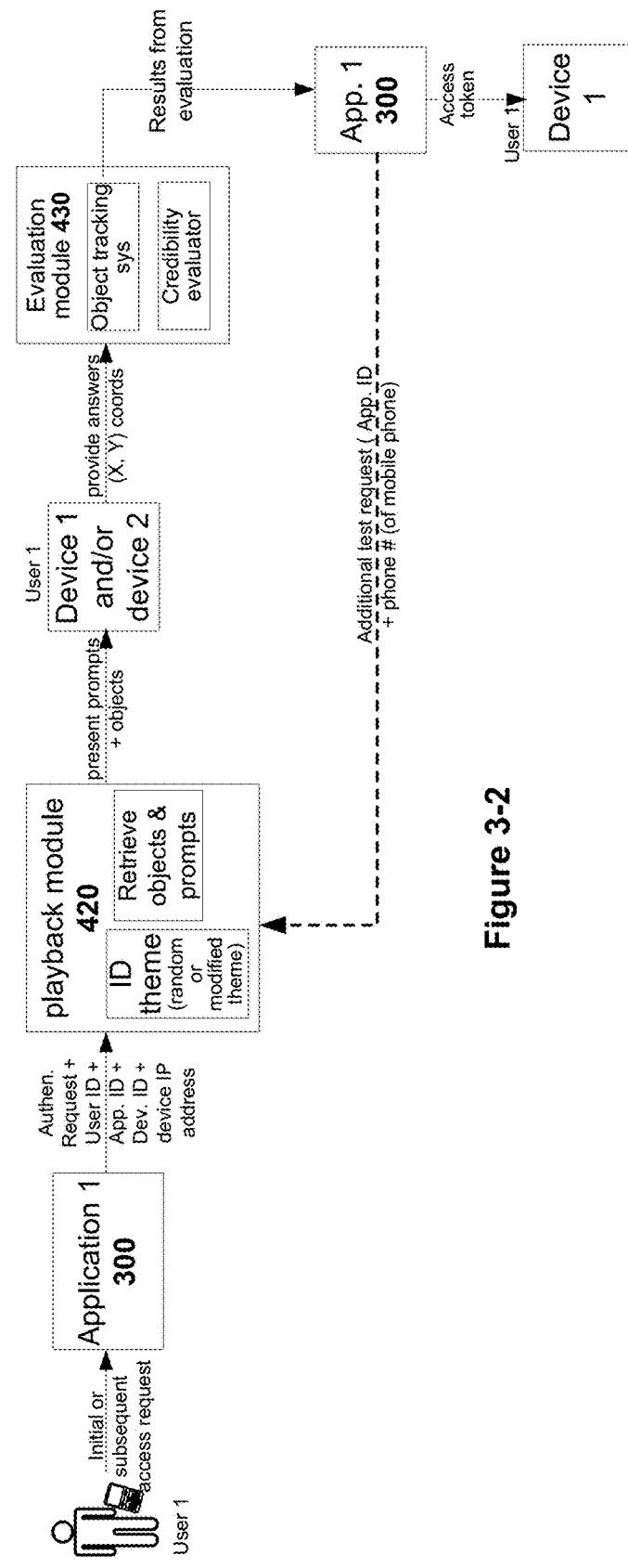
Figure 3-2
Figure 3

METHODS FOR USER AUTHENTICATION

CLAIM OF PRIORITY

This application claims priority to U.S. Provisional Application No. 62/350,657, filed Jun. 15, 2016, and entitled, "Methods for User Authentication," the disclosure of which is incorporated herein by reference in its entirety.

FIELD OF THE INVENTION

The present invention relates to an authentication system for protecting assets of users available on a network.

BACKGROUND

Description of the Related Art

The advent of computers and the Internet has heralded a whole new way of accessing information and conducting business. The Internet has allowed users to access and share information, conduct online trades, collaborate with other users in a business and/or personal setting, socially interact with other users through electronic mail, real-time messaging, social media, online gaming, etc. With the growing popularity of electronic commerce, social media, online gaming, etc., it has become especially critical that the digital assets of users be protected from online attackers. The easiest and obvious way of protecting the digital assets from unauthorized access is by restricting access to the digital assets and enforcing an authentication scheme to gain access to the digital assets. A common authentication scheme uses passwords for gaining access. These passwords are usually a combination of letters, numbers, or both letters and numbers. A carefully selected password can thwart other people from hacking the computer system and gaining access to the digital assets stored therein, as the passwords usually are hidden within permutation of numbers and letters.

However, providing access to the digital assets with just the password has its own drawbacks. For example, if a password is kept too short, there is a high likelihood that the password can be easily guessed by other people by sheer observation. Further, the advent of computers has also heralded the age of computer programs. A cleverly designed computer program could be used to perform a brute force attack to break a carefully crafted password, as there are very limited permutations and combinations for the alphanumeric characters within the short password. In addition to the brute-force attack using the computer program, additional techniques or tools may be used to hack into systems to access the digital assets of users. Some of the techniques or tools to hack into systems include "man-in-the-middle" attack wherein a third user secretly inserts himself in the communication pathway between two individuals to relay and possibly alter communication (including exchange of encryption keys) between two individuals, a key-logging software/tool to log every keystroke of a user and using the log to replicate the password to gain access, spoofing attack wherein a malicious party impersonates another device or user on a network by falsifying data to gain access to the system on which the digital assets are stored.

To overcome the drawbacks of such authentication techniques, elongated passwords with additional restrictions, such as usage of upper and lower case alphabets, non-alphanumeric characters, were implemented. However, such authentication schemes became more burdensome on the users as the long password with different restrictions became too hard for the user to remember leading to the users keeping a written record of the same, defeating the very purpose of anonymity that the password was meant to provide.

At the heart of the various authentication systems is that passwords are inherently machine language. Users are forced to engage with the computers on a level that the computers can understand. The currently available password schemes are all presented in natural machine interface that can be overcome using the various techniques described above.

To combat the weakness of the password schemes, other authentication solutions were brought to market, such as biometrics. The challenge with biometrics is one cannot change the source. So, if or when a biometric of an individual is duplicated, all security is permanently compromised for that individual. There is therefore a need for an authentication system that has to be people-proof so that a casual observer watching a login will not be able to replicate the password, and computer-proof so that the digital asset cannot be accessed via brute-force attack, or replicated by a computer from data collected by a key-logging tool or from man-in-the-middle attack.

It is in this context, embodiments of the invention arise.

SUMMARY OF THE INVENTION

The embodiments of the invention include methods and system for providing a password scheme for authenticating a user that is centered on a theme. This theme-based authentication scheme is hard to reverse engineer either by an observer or by a computer. The theme-based authentication scheme that is used as a basis for passwords includes identifying a theme that is selected for or by a user, presenting analog images associated with the theme for user selection, evaluating user interaction at the various images, and providing access to an application that requires user authentication.

A user initially goes through an enrollment process to select a theme. In some implementations, the authentication system allows the user to create their own theme. The authentication system remembers the theme created by the user by storing the association of the user-created theme to the user. Alternately, the authentication system presents a pre-defined list of themes for user selection and associates a theme selected by the user from the pre-defined list. In this case, the user has to remember the theme. Essentially, the different embodiments allow the authentication system to assign a theme for the user or store a theme created by the user. Each of these choices includes its own security characteristics.

Once the user is enrolled in the authentication system and a theme (either user-created or system assigned) has been associated with the user, the authentication system will use the theme to authenticate the user every time the user accesses an application. When the authentication system detects selection of an application by the user for which user authentication is required, the authentication system engages a playback process to identify the theme associated with the user and to provide relevant prompts to verify the user. The playback process may present analog images of a plurality of theme-based and non-theme-based objects associated with the user's theme and theme relevant prompts that require user interaction at the various objects or on the user interface where the objects are presented. The user interaction at the various objects or at the user interface is captured as answers to the theme-based prompts. The authentication system then engages an evaluation process to evaluate the answers provided by the user and to determine a credibility score of the user based on the user's answers to the prompts. The authentication system or the application then determines whether to provide the user access to the application or not.

It should be noted that the enrollment process is performed only once to initially enroll the user into the authentication system. The playback process and the evaluation process are performed every time the user accesses the application.

BRIEF DESCRIPTION OF THE DRAWINGS

The present invention will be readily understood by the following detailed description taken in conjunction with the accompanying drawings.

FIG. 2 illustrates a simplified data flow diagram identifying flow of data within the authentication system, in one embodiment of the invention. FIG. 2-1 illustrates the enrollment process and FIG. 2-2 illustrates the playback and evaluation process, in one embodiment of the invention.

FIG. 3 illustrates a simplified data flow diagram identifying flow of data within the authentication system, in an alternate embodiment of the invention. FIG. 3-1 illustrates the enrollment process and FIG. 3-2 illustrates the playback and evaluation process, in the alternate embodiment.

DETAILED DESCRIPTION

Figure 1:
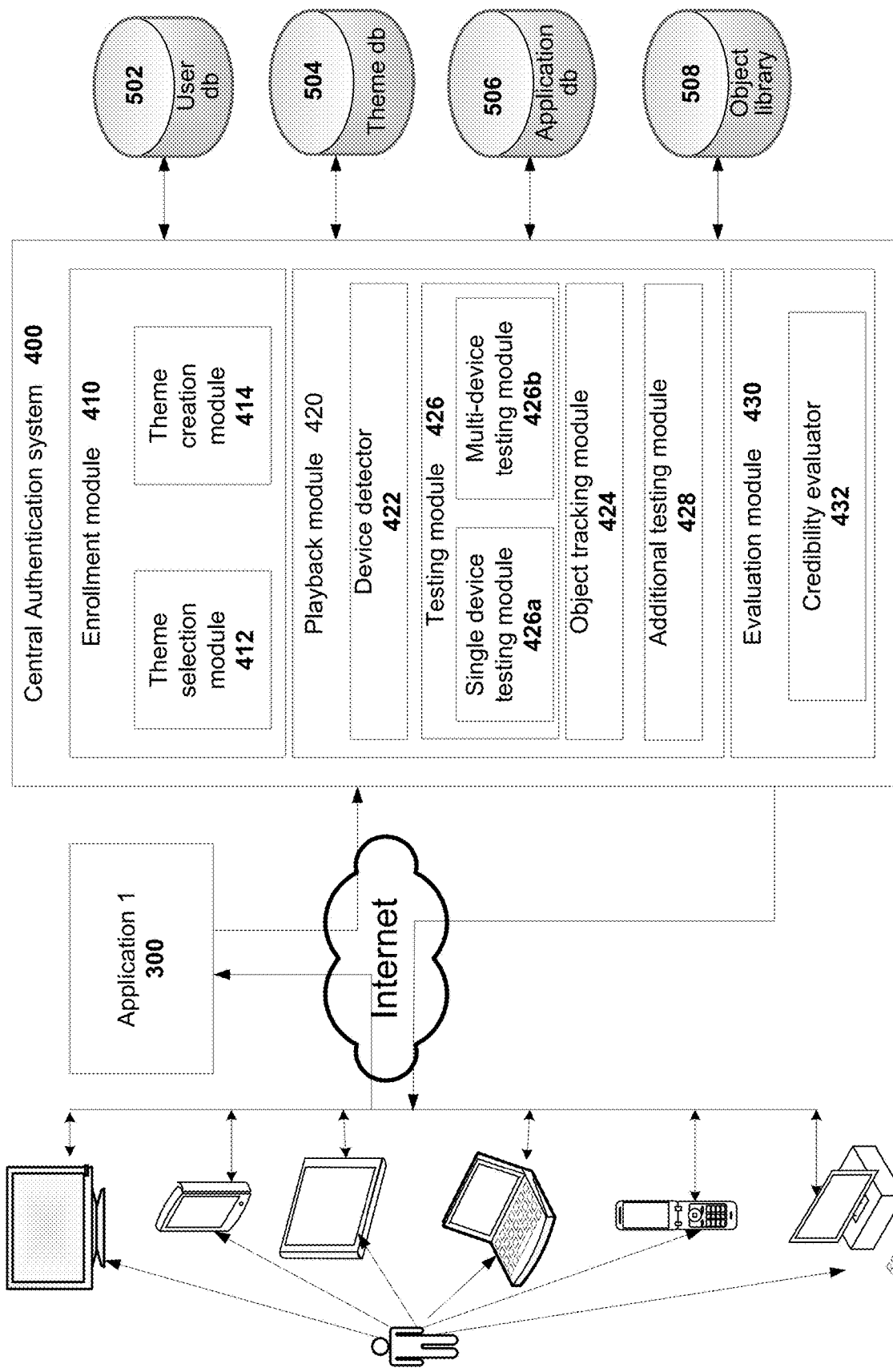
FIG. 1 illustrates a simplified block diagram of an authentication system identifying various modules and the interaction between the various modules within the authentication system used for authenticating a user for providing access to an application, in one embodiment of the invention.

Several exemplary embodiments for providing an authentication system that is easy for people to identify themselves yet is mathematically improbable to hack using computers and sufficiently difficult for humans to guess or replicate even with direct observation, will now be described. The basis for the various embodiments is thematic cognition. The embodiments describe a password system that leverages cognitive themes. The password system identifies potential building blocks that can be assembled to solve all security identity issues from conventional applications including CAPTCHA (Completely Automated Public Turing Test to tell Computers and Humans Apart) (identifying that a user is not a machine) to single factor authentication to multi-factor authentication. It will be apparent to those skilled in the art that the present invention may be practiced without some or all of the specific details set forth herein. Although the embodiments are extensively described with reference to specific authentication factor, the teachings of the invention can be extended to other authentication factors that suffer similar disadvantages.

Typically, an authentication scheme requires certain number of user credentials for identity verification of a user. Depending on the sensitivity of a digital asset that is accessed through an application, an application developer may determine the number of authentication factors (i.e, user credentials) that are required for identity verification. As a result, a zero factor authentication, one factor authentication, two factor authentication, etc., may be defined for an application. An authentication factor is an independent category of credential used for identity verification. The common categories used in identity verification are described as something a user knows (i.e., knowledge factor), something the user has (i.e., possession factor) and something the user is (i.e., inherence factor). Depending on requirements for security, additional authentication factors, such as location of a user (i.e., geo factor) and time of access (i.e., temporal factor) may also be considered.

The most commonly used form of authentication factor is the Knowledge factor, wherein the user is required to provide knowledge of a secret (e.g., a password) in order to get authenticated. Many authentication schemes use password in single factor authentication scheme or as one of the factors in a multifactor authentication scheme. Possession factors require a key that only the user has to unlock a lock. The key embodies a secret that is shared between the lock and the key. The possession factor may be used in multi-factor authentication scheme. Inherence factors are associated with the user and are usually biometric in nature, such as fingerprints, retina, voice recognition, etc., that can be verified using fingerprint readers, retina scanners or voice recognition tool. As was explained before, the inherence factors and to an extent the possession factors may be compromised for a user, and once the user is compromised these authentication factors become useless.

The present invention defines an authentication system and methods that rely on knowledge factor authentication but use themes as a basis for passwords. During an enrollment process, the authentication system requests a user to select a theme. After the user enrolls into the theme-based authentication scheme, the authentication system presents analog images of theme-based and non-theme-based objects on a screen of a user's device along with relevant prompts for user interaction. A user using the various embodiments of the authentication system described herein can demonstrate their knowledge of the selected theme by interacting with the select ones of the objects rendered on the screen or at select location on the screen. The user interactions at the screen provide few data points that the authentication system is able to verify. A third party who is observing the user interaction will be unable to correlate the user actions and guess the theme-based password accurately. Further, it will be difficult for a computer to reverse engineer the theme using such data points as very few data points of the theme are available.

In accordance to an embodiment, a user selects an application that requires user authentication before the application can provide access to a digital asset. The user selection is detected by the application, which re-directs the application to an authentication system assuming the user is currently enrolled. If the user is not currently enrolled in the authentication system, the application may prompt the user to enroll by directing the user to the authentication enrollment system, which then provides a list of pre-defined themes for user selection. User selection of a theme is recorded and associated with the user. After user enrollment or during subsequent access to the application by the user, a graphical depiction (i.e., analog format) of the theme along with other theme possibilities is provided to a user along with theme-relevant prompts for user interaction. The graphical depiction, for example, may be in the form of user-associated theme and non-theme-based objects, wherein the non-theme-based objects representing other themes provide sufficient noise that are orders of magnitude greater than the theme-based objects. The objects (theme and non-theme-based objects) may be rotating or moving in real-time when presented on the screen, or the objects may have other characteristics, such as varying colors, size, etc., so as to provide sufficient noise. User interactions at the graphical depiction may be used as answers for the prompts associated with the theme. For example, the user interaction at three theme-based objects can be used by the authentication system to draw a connection to the same thematic concept associated with the user. In some embodiments, the user interaction at different graphically depicted objects are registered as (X, Y) coordinates and a back end object tracking module within the authentication system is used to determine theme-based objects selected by the user by determining location of every object presented on the screen of the user's device within any given time window and by matching the (X, Y) coordinates and time stamp provided in the user interactions with the coordinates of the various objects at specific times.

In some embodiments, as part of the enrollment process, the authentication system may allow the user to do some dry-runs by presenting theme-relevant objects with non-theme-relevant objects and allowing the user to practice identifying the theme amongst sources of noise presented in the graphically depicted objects, until the user and/or the system are convinced of the user's capability to recognize the theme. Once the user has completed this enrollment and dry-run tests, the authentication system, in some embodiments, may return the user selected theme as an encrypted hash back to the application. Alternately, the authentication system may store the user selected theme and the answers for later retrieval for identity verification.

Anytime the user wants to access the application, the application communicates with the authentication system, supplies the user's location (e.g., IP address), application identifier (ID), and the hash of the theme or user identifier. The authentication system would then unfold the theme by decrypting the hash, generate a test for user interaction, send it to the location, evaluate answers to the test, compute the user's credibility score based on the evaluated answers, and return results of the test along with the user's credibility score to the application. Depending on the level of authentication required by the application, the application may request additional test from the user by generating a new request to the authentication system and supplying the application ID and location. In some embodiments, in addition to the new request a phone number may also be provided by the application. The phone number may be related to a mobile phone associated with the user that is capable of establishing a communication connection over a network, such as the Internet or short message service (SMS) capable network. The mobile phone number may be obtained from a user-profile maintained for the user. The mobile phone might be a different device than the device of the user that was used to initially authenticate the user. For example, the user may have accessed the application from a first device, such as a desktop computer, a laptop computer, etc., and the answers to the theme-relevant prompts provided using input/output devices associated with the first device. Based on the credibility score of the user, the application may request additional test and supply details of a second device. In some embodiments, the details may include a mobile phone number of the user and a token to allow the authentication system to establish communication connection with the mobile phone of the user. In alternate embodiments, the application may provide details of a different computer device, such as a second laptop computer device, second desktop computer device, so as to allow the second computer device to receive the additional authentication test or instructions from the authentication system. In such embodiments, the application may provide IP address and a token identifying the second laptop computer device so as to allow the authentication system to establish communication with the second computer device and present the additional tests to the second computer device during user authentication.

In the case where the second computer device is a mobile phone of the user, the authentication system may generate one or more additional tests and present them at the mobile phone of the user. The additional test, for example, may be a game related to a random theme that is presented for user interaction or it may be a game related to a modified theme associated with the user or may be additional game(s) related to the theme associated with the user. Answers received from the mobile phone of the user are evaluated and the credibility score of the user obtained from the first test is updated to reflect the answers from the additional test. Results from the additional tests are returned to the application along with the corresponding credibility score of the user that takes into consideration the results from the additional tests. The application may evaluate the results from the additional tests and determine if the user can be provided access to the application.

The authentication system provides the ability to generate sufficient misdirection for a casual observer seeking to steal the authentication scheme by introducing colors or varying shades to the graphical objects, allowing a user to select different languages for identifying objects, adding different theme objects, using additional devices associated with the user, etc. Further, the authentication system, in some embodiments, provides the ability to avoid vulnerabilities through key-logging, when desired, by ensuring that no keystrokes are recorded. In a Human Interface Device (HID) attack, the residual elements that can be recorded are the (X, Y) coordinates of objects selected by the users. In some embodiments, the user may select the objects from graphical representation using a touch screen associated with the user's device. In such embodiments, when the user selects two different objects associated with the theme of the user, the authentication system records only the (X, Y) touch coordinate pairs of the two objects with a ballistics vector between them. In other embodiments, the authentication system may allow keyboard interaction. In such embodiments, the authentication system may add more complexity for user authentication so that the keyboard interactions captured through the key-logging tool may not be able to replicate the user's theme-based password by allowing the keyboard interactions for the theme to be language dependent.

In some embodiments, the authentication system may allow the user to create his own theme or may capture a theme that is personal or unique to the user. In some implementations, the user may be allowed to upload user captured images or pictures and use these images or pictures as part of the graphical depiction of the objects for the user-created theme. The user-created theme along with the user uploaded images or pictures may be stored by the authentication system or returned to the application for storing or may be stored on a cloud or on a trusted third party site. In some embodiments, the user created theme and the uploaded images are encrypted and stored. The authentication of the user is performed using the stored authentication data and the results of the authentication are returned to the designated application, which uses the results to provide access to the user. With the general understanding of the invention, specific embodiments will now be described with reference to the various drawings.

FIG. 1 illustrates a simplified block diagram of an authentication system that is used to implement a theme-based authentication scheme for authenticating the user, in one embodiment. A user (user 1) may access an application (Application 1) 300 running on a server (not shown) over a network 200, using any one of the user 1's devices, 101a, 101b, 101c, etc. The server may be part of a local area network, a wide area network, a metropolitan area network, a personal area network, a virtual private network, an enterprise private network, etc. In one embodiment, user 1 may use device 101a (e.g., a desktop computer) to request access to Application 1. Application 1 receives the request and, in response, directs the user to a central authentication system 400. The central authentication system 400 may be provided with application identifier of Application 1. The central authentication system 400 (simply referred to herein onward as "authentication system") may be executed on a server (not shown) or a virtual server (not shown) within a cloud system, for example, and be accessible by different applications that may require user authentication prior to providing access to the user.

The authentication system 400 includes a plurality of modules and sub-modules that are used in the implementation of the user authentication scheme. For example, the authentication system 400 includes an enrollment module 410, a playback module 420 and an evaluation module 430. The enrollment module 410 is configured to allow the user to enroll in to the authentication system. To begin with, the enrollment module 410 interacts with an application database 506 to determine the security requirements and the type of authentication (i.e., zero factor, single factor or multi-factor authentication) defined for Application 1 300. The authentication system 400 uses the security requirements defined for Application 1 300 during user authentication process.

As mentioned previously, the authentication system 400 may assign a theme for the user or allow the user to create a theme. In one embodiment, in order to assign a theme, a theme selection sub-module 412 of the authentication system 400 is engaged to interact with a user database 502 to obtain the user profile of the user and use the user profile to identify the themes for presenting to the user for user selection. In some embodiments, the theme selection sub-module 412 uses the information provided in the user profile of the user to query a theme database 504 and to identify a list of themes for the user. For example, a young kid trying to access an Application (Application 1 300), such as an email application, may be presented with kid-centric themes for selection.

User selection of the theme is detected by the theme selection sub-module 412 of the enrollment module 410 and, in response, a list of question prompts are presented to the user for user response. The answers to the theme-based question prompts provided in the user response for the selected theme are specific for the user. For example, the answer sequence for the question prompts may be unique for the user. The selected theme is assigned to the user and the answers provided to the theme-based question prompts are used to determine the theme-based password during authentication. For example, answers to a query prompt, such as "don't feed the tall man", could be used for validating the user during authentication process. The answers provided by the user during enrollment are equivalent to a password. But unlike password that requires all characters to be present for user validation, not all answers provided by the user need to be present for user validation. The user can be validated with minimal number of answers (i.e., few authentication data points).

Once the theme is selected, the enrollment module 410 of the authentication system 400 may provide dry-runs for the user to ensure that the user demonstrates a good understanding of the theme. The dry-runs are provided using analog images of theme-based and non-theme-based objects for user selection. In some embodiments, the objects presented to the user are rotating and/or moving in real-time on the screen of the user's device. In some embodiments, the non-theme-based objects provide sufficient noise that is orders of magnitude greater than the theme-based objects. Significant noise is provided to ensure that there are sufficient objects to provide mis-directions for casual observers that are trying to replicate the user's theme-based password answers. In some embodiments, the non-theme-based objects also are moving or rotating in real-time in a manner similar to the theme-based objects so as to ensure that a casual observer does not detect the difference in the behavior of the theme-based objects from the non-theme-based objects. User interactions at the objects are verified against the answers provided to the theme-based prompts and are used to determine if the user has sufficient understanding of the selected theme. When the user has demonstrated sufficient mastery in understanding the theme-based prompts, the authentication system would hash the theme and supply the theme to Application 1.

In an alternate embodiment, the authentication system may engage a theme creation sub-module 414 and allow the user to create his own theme. In this embodiment, the theme creation sub-module 414 may allow the user to upload his own images, pictures for the theme or allow the user to select from a set of images or pictures provided by the theme creation sub-module 414. The theme-creation sub-module 414 may, in some embodiments, analyze the images, pictures uploaded by the user or selected by the user to identify relevant objects that are related to the theme and use it to identify other theme-based objects from an object library 508. In other embodiments, the theme-creation sub-module 414 may use keywords from the user-created theme to identify theme-based objects. Once the theme is created for the user, objects related to the theme and non-theme are presented to the user, as described above. The user-created theme is updated to the theme database 504 and to the user database 502.

Upon selecting or creating a theme, a playback module 420 may be engaged to authenticate the user. In some embodiments, a device detector sub-module 422 may be used to identify the device from which the user is accessing the application. This may be verified using tokens provided with the user request for accessing Application 1 300. The authentication system 400 then performs a theme based testing using a testing sub-module 426. The testing sub-module 425 engages either a single device testing sub-module 426a or a multi-device testing sub-module 426b to present objects and theme-based prompts to the user on a display screen of the identified device. In the case where the single device testing sub-module 426a is used, the objects and theme-based prompts are presented to the identified device (e.g., device 102b) of the user from where the application request was initiated, in one embodiment. The user authentication test, in one embodiment, is performed on a single device but in different formats. For example, a first portion of the user authentication test is presented in textual format on the screen alongside the objects and the second portion of the user authentication test is presented in audio format or haptic format or as a visual cue, etc., at the first device 102b. The first portion is called the anchor portion of the user authentication test and the second portion is called the dynamic portion.

In the case where the multi-device testing sub-module 426b is used, the anchor portion of the user authentication test is presented on the first device (i.e., 102b) and the dynamic portion of the user authentication test is presented on the second device. In one embodiment, the format of both the anchor portion presented at the first device and the dynamic portion presented at the second device are textual in nature. In an alternate embodiment, the anchor portion may be presented in textual format at the first device and the dynamic portion may be presented in audio format at the second device. In yet another embodiment, the anchor portion may be presented in audio format on the first device and the dynamic portion may be presented at the second device in textual format or haptic format or any other format that can be detected by the user using any component of the second device. In some embodiments, the access to the application may be requested from the first device and, in response, the testing may be done on the second device and that testing may take any format. In some embodiments, the response to the prompts may be provided using the second device. Alternately, the prompts may be provided on the second device and the response may be received from the first device. The second device is either specified by the user at the time of testing or identified from the profile information of the user. In one embodiment that uses the second device of the user for testing, the authentication system provides the objects for rendering on a screen of the second device and prompts the user to respond to the prompts using the input/output components of the second device. The objects may be moving and/or rotating in real-time.

User response to the prompts is captured by an object tracking sub-module 424 executing in the back-end. In some embodiments, the user responses at different objects are captured as (X, Y) coordinate pairs with ballistics connection between them. The object tracking sub-module 424 determines the location of each object presented to the user at different time period and correlates the user responses received at specific times to the object mapping using the coordinate pairs to identify the objects that the user has interacted with. The user responses are then verified against the user answers provided for the theme.

In one embodiment, the results from the user response verification are forwarded to an evaluation module 430. A credibility evaluator sub-module 432 determines a level of credibility specified for each application and computes a credibility score of the user. For example, a developer of Application 1 may have indicated that the user's answers have to be at least 70% accurate prior to providing access to Application 1. In another example, a developer of Application 2 may require that the user's response is at least 95% accurate to grant access to the Application 2. Based on each application's authentication level (i.e., level of credibility) and the credibility score of the user, the application may grant access to the user or not.

If Application 1 has very stringent authentication criteria and the credibility score of the user does not meet the authentication criteria, Application 1 may request additional tests of the user. In such embodiments, an additional test request may be initiated by Application 1. The additional test request may be presented along with application identifier of Application 1 to the authentication system. In addition to the application identifier, Application 1 may provide additional information, such as theme identifier, user identifier, device identifier, user location (i.e., IP address) etc. When an application has stringent authentication criteria, the device identifier of the first device, IP address of the first device, time of day the access request was initiated, etc., may be used to further authenticate the user. In some embodiments, Application 1 may identify a phone number for a mobile phone associated with the user or an identifier of a second device to direct the additional test.

An additional testing module 428 within the playback module 420 receives the additional test request information provided by Application 1, hashes the theme, identifies the various information provided, identifies the objects for running the theme-based test and forwards the objects with theme-relevant prompts to either the first device or the second device specified in the additional test request, for user interaction. In some embodiments, the additional test can be based on a random theme. In some other embodiments, the additional test may be related to the theme associated with the user. In alternate embodiments, the additional test may be related to a modified form of the theme associated with the user. User responses are received and evaluated for the additional test and the credibility score of the user is updated, based on the evaluation. Access to Application 1 is provided to the user based on the updated credibility score.

Figure 6:
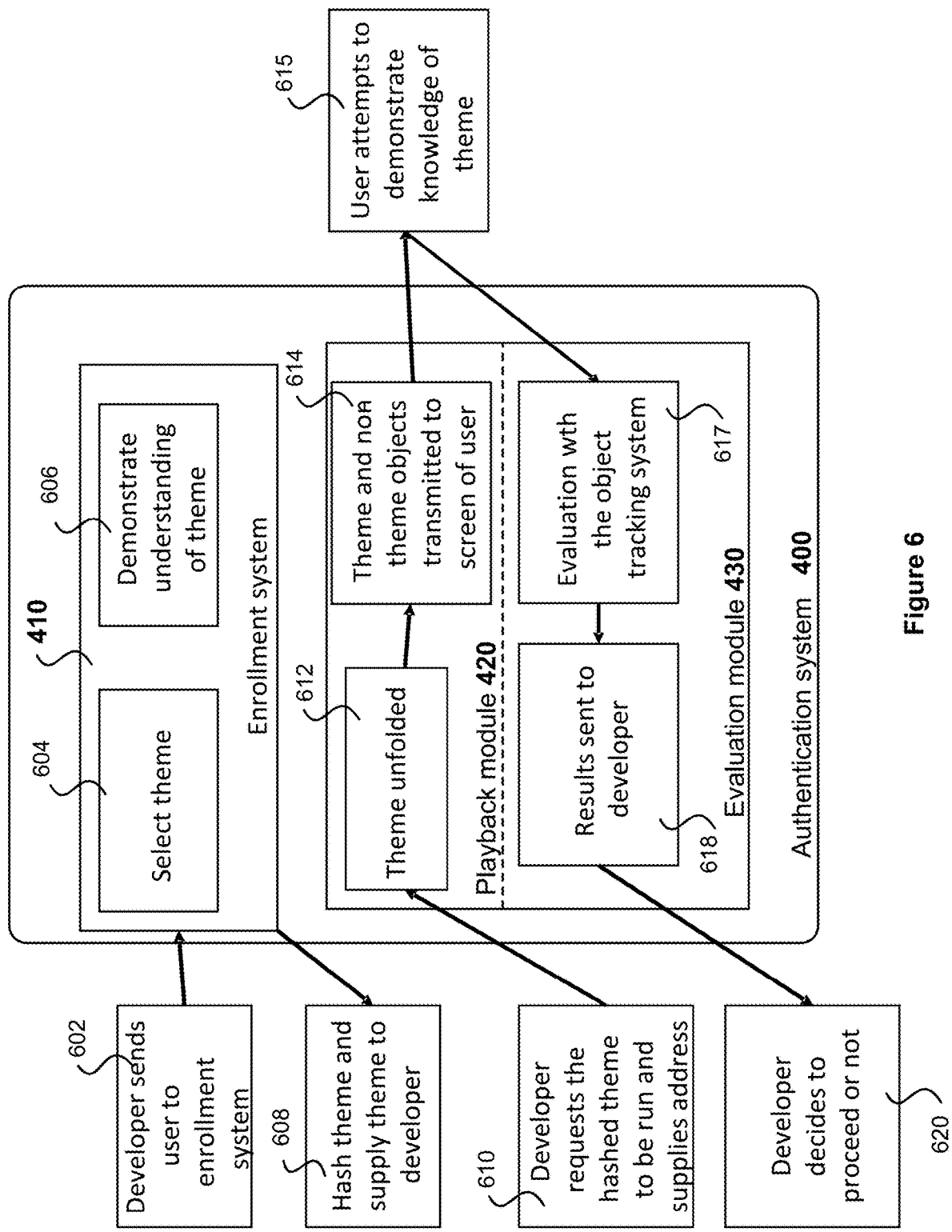
FIG. 6 illustrates a graphical representation of roll of various modules within the authentication system that is used during user authentication process, in one embodiment of the invention.

FIG. 2 illustrates the authentication process engaged for authenticating a user and FIG. 6 illustrates the process flow through different modules of the authentication system, in one embodiment. FIG. 2-1 illustrates the enrollment process that is performed by the enrollment system (also referred to herein as the "enrollment module") 410 of FIG. 6, and FIG. 2-2 illustrates the playback process, evaluation process that is performed by the playback module 420, evaluation module 430 of the authentication system 400 illustrated in FIG. 6. Referring simultaneously to FIGS. 2-1, 2-2 and 6, user 1 initiates an access request for Application 1 using a device, device 1. Application 1 receives the access request and, in turn, initiates an authentication request 602 and forwards it to an authentication system 400. The authentication system 400 verifies to see if user 1 has already enrolled in the authentication system 400. When it is determined that user 1 is not enrolled, the authentication system engages an enrollment module 410, which provides options to the user to select a theme 604 by identifying and presenting a list of themes for the user. The enrollment module 410 provides theme-related prompts and receives user's response to the prompts. The enrollment module 410 also provides test runs with theme-related prompts and evaluates the user's responses to ensure that user 1 demonstrates understanding of the theme 606. The prompts and user responses to the prompts are stored locally by the authentication system for performing identity verification. The enrollment module then hashes the theme 608, encrypts the theme and supplies the encrypted theme to Application 1. Application 1 stores the theme locally for later retrieval.

Referring now to FIG. 2-2, upon enrolling into the authentication system or in response to subsequent access request, the access request is processed by Application 1. As part of processing the access request, Application 1 retrieves the theme associated with user 1 and forwards the hashed theme with the Application 1 identifier and address (e.g., IP address) of user 1 610 to the authentication system 400 requesting the authentication system to run the hashed theme and authenticate the user. In some embodiments, the Application 1 may also identify and forward a level of credibility (defined by the developer of the application based on the type of application) required for the user in order to declare successful authentication of the user. The playback module 420 receives the request, unfolds or decrypts the hashed theme 612 and identifies the theme-based prompts for the theme. The playback module 420 identifies and returns objects (theme-based and non-theme-based) and theme-related prompts 614 to device 1 (or any other device) of user 1 for user response. It should be noted that the theme-related prompts returned for user response are related to the objects returned to the device 1. For example, a prompt, such as "feed the tall one", is provided when the objects returned to the device includes at least one object that can be identified as the tall one. In response to the rendering of the objects and the theme-related prompts, user 1 attempts to demonstrate knowledge of the theme by responding to the prompts 615. User response at device 1 is captured and forwarded to the authentication system 400 as (X, Y) coordinate pairs.

In one embodiment, the evaluation module 430 receives and evaluates the user response. In an alternate embodiment, the evaluation module 430 receives the user response and communicates with the playback module 420 to evaluate the user response. In some embodiments, the playback module 420 evaluates the user response (provided as (X, Y) coordinate pair) by tracking location (coordinate pairs) of the various objects rendered on the display associated with device 1 at different periods of time and matching a specific one of the coordinate pairs with the coordinate pair provided in the user response to identify the object selected by the user. The identified object is verified against the user answers stored for the theme in local storage. The evaluated data is shared with the evaluation module 430.

The evaluation module 430 computes a credibility score of the user based on user response evaluation. The results from the evaluation are forwarded 618 to Application 1 along with user 1's credibility score. Based on user 1's credibility score in relation to the credibility level defined for Application 1, Application 1 decides to grant or not grant access to user 1 620. When Application 1 decides to grant access, it forwards an access token to device 1 allowing user 1 to access Application 1.

Figure 7:
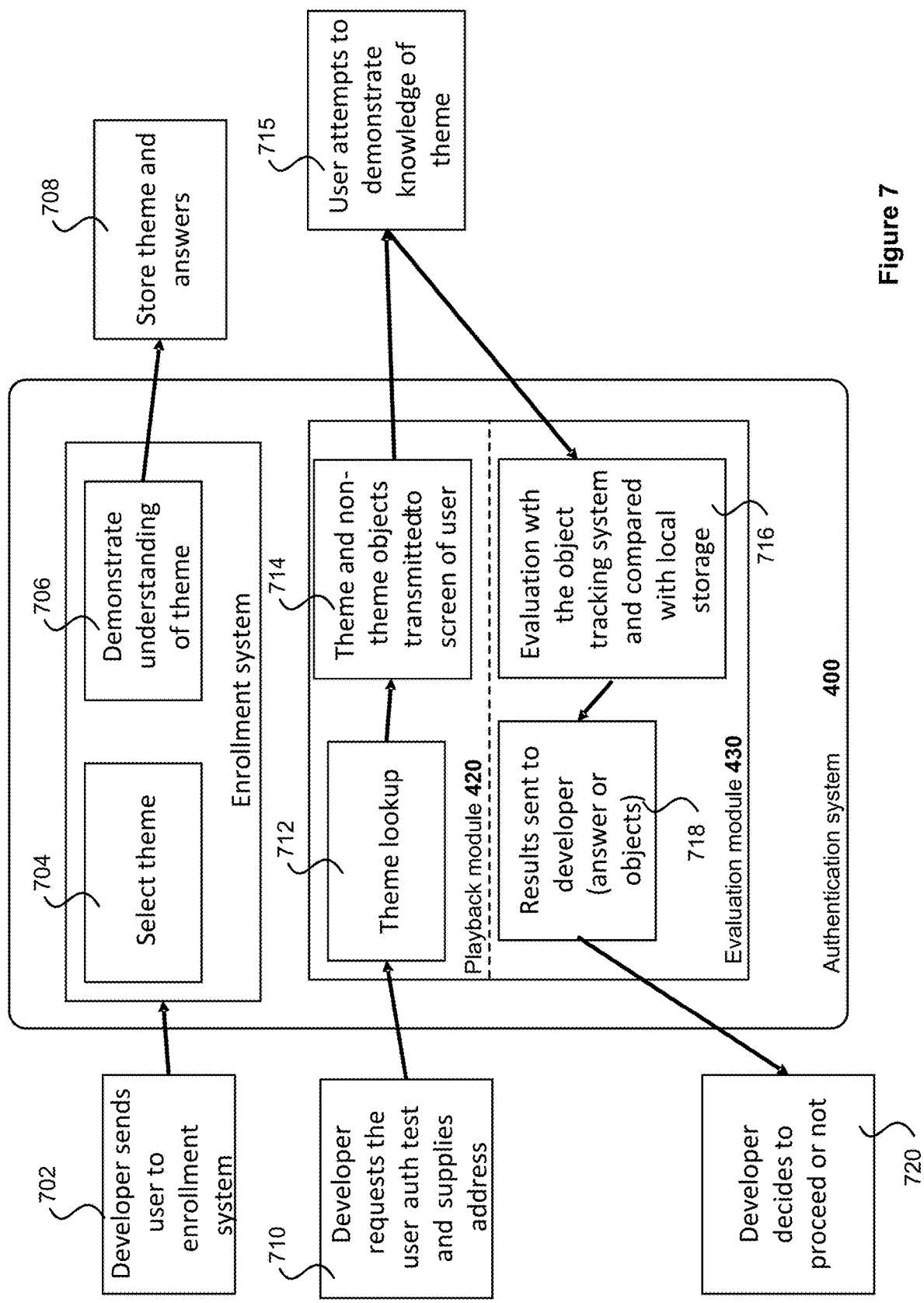
FIG. 7 illustrates a graphical representation of roll of various modules within the authentication system that is used during user authentication process, in an alternate embodiment of the invention.

FIG. 3 illustrates the authentication process engaged for authenticating a user and FIG. 7 illustrates process flow through different modules of the authentication system 400, in an alternate embodiment. FIG. 3-1 illustrates the enrollment process that is performed by the enrollment system (also referred to herein as the "enrollment module") 410 of FIG. 7, which is an alternate embodiment to the enrollment process discussed with reference to FIG. 2-1. In the embodiment illustrated in FIG. 3-1, the theme related information is stored in a central repository versus locally, as was discussed in the embodiment illustrated in FIG. 2-1. FIG. 3-2 illustrates the playback process, evaluation process that is performed by the playback module 420, evaluation module 430 of the authentication system 400 illustrated in FIG. 7, which is an alternate embodiment to the evaluation process discussed with reference to FIG. 6. In the embodiment illustrated in FIG. 7, additional test request may be generated by the application 1 to further authenticate the user and forwarded to the playback module and the playback module performs the additional test as will be discussed in greater detail.

Referring simultaneously to FIGS. 3-1 and 7, user 1 initiates an access request for Application 1. Application 1 receives the request along with user identifier, device identifier of the first device from which the user initiated the request, and, in turn, initiates an authentication request 702 to an authentication system 400. The authentication request includes the user identifier, device identifier of the first device and application identifier of Application 1. The enrollment system (also referred to as "enrollment module") 410 verifies to see if user 1 has already enrolled in the authentication system. When it is determined that user 1 is not enrolled, the enrollment system 410 provides options to the user to select a theme 704 by identifying and presenting a list of themes for the user. The enrollment module 410 provides theme related prompts and receives user 1's response to the prompts. The enrollment module 410 also provides test runs with theme-related prompts to ensure that user 1 demonstrates understanding of the theme 706. The prompts, user responses, and the theme are stored in a central repository 708 by the authentication system for performing identity verification of the user.

Referring now to FIG. 3-2, upon enrolling into the authentication system or in response to subsequent access request, a user authentication test is initiated 710 by Application 1 and forwarded to the authentication system 400 along with location of device 1 (i.e., IP address) and one or more of Application 1 identifier, user identifier of user 1, device identifier of device 1, device address of device 1, etc., to the authentication system. A playback module 420 receives the request, queries a theme database (i.e., central repository) using the Application identifier and user identifier to identify the theme associated with the user identifier and the theme-based prompts for the theme. The playback module 420 identifies and returns objects (theme-based and non-theme-based) and select ones of the theme-related prompts to device 1 for rendering and user response 714. As mentioned earlier, the theme-related prompts returned for user response are related to the objects returned to device 1. In response to the prompts and objects, user 1 attempts to demonstrate knowledge of theme by responding to the prompts 715. User response is forwarded to the authentication system as coordinate (X, Y) pairs. User interaction at device 1 is captured as user response and forwarded to the authentication system as (X, Y) coordinate pairs. The playback module 420 and/or the evaluation module 430 receive and evaluate the user response. As mentioned earlier with reference to FIG. 6, the playback module 420 evaluates the user response by tracking the location coordinates of the various objects at different periods of time and matching the coordinate pairs in user responses to specific coordinate pairs of objects and verifying the identified objects against the user answers stored for the theme in central repository. The evaluated data is shared with the evaluation module 430. The evaluation module 430 computes a credibility score of user 1 based on user 1's response evaluation. The results from the evaluation 718 are forwarded to Application 1 along with user 1's credibility score.

Based on user 1's credibility score and based on the type of application, Application 1 may request additional authentication before granting access to user 1 720. The Application 1 may send an additional test request to the playback module 420 (FIG. 3-2) of the authentication system. The additional test request may include one or more of the user identifier, application identifier, device identifier, device address, etc. In some embodiments, the device identifier in the additional test request may be different from the device identifier provided in the initial authentication request. The device identifier (e.g., phone number, device address, etc., may be obtained from the theme related information for the user stored in the central repository. Where a second device is identified for the additional test, the additional test request may include a token and/or IP address of the second device so as to allow the authentication system to establish communication connection with the second device of the user.

The playback module 420 receives the additional test request and, in response, retrieves objects and prompts for the user from the central repository and provides the retrieved objects and prompts to the device identified in the additional test request through the communication connection established between the device and the authentication system. The device may be either device 1 where the objects and prompts for the initial authentication request were rendered or could be a second device associated with the user 1. Further, the format of the additional test may be same as the initial test or may be of different format. For example, the initial test may be provided in textual or image format while the additional test may be provided in audio format. Additionally, the theme for the additional test may be same as that of the initial test or a modified theme or a random theme, such as a game-related theme. By varying the theme, the format and/or the device for performing the authentication, the authentication system introduces sufficient complexity that cannot be easily replicated by a casual observer. Further complexity may be introduced during the initial test and/or the additional test by introducing variation in colors or shades of the objects, language used for prompts, user interface used for response, etc. As the responses to the prompts are recorded as coordinates, no keystrokes are recorded. In some embodiments, the prompts may require keystrokes. However, in such embodiments, the tests are designed to introduce sufficient complexity that no keystroke capturing tools or casual observer can easily replicate the user's theme based password.

Responses to the additional tests are evaluated and the credibility score of the user obtained from the first test is updated to reflect the response from the additional test. The results from the additional tests are returned to Application 1 along with the updated credibility score of the user. The Application 1 may evaluate the score from the additional test and determine granting access to the user. When Application 1 decides to grant access, it forwards an access token to device 1 allowing user 1 to access Application 1.

Figure 4:
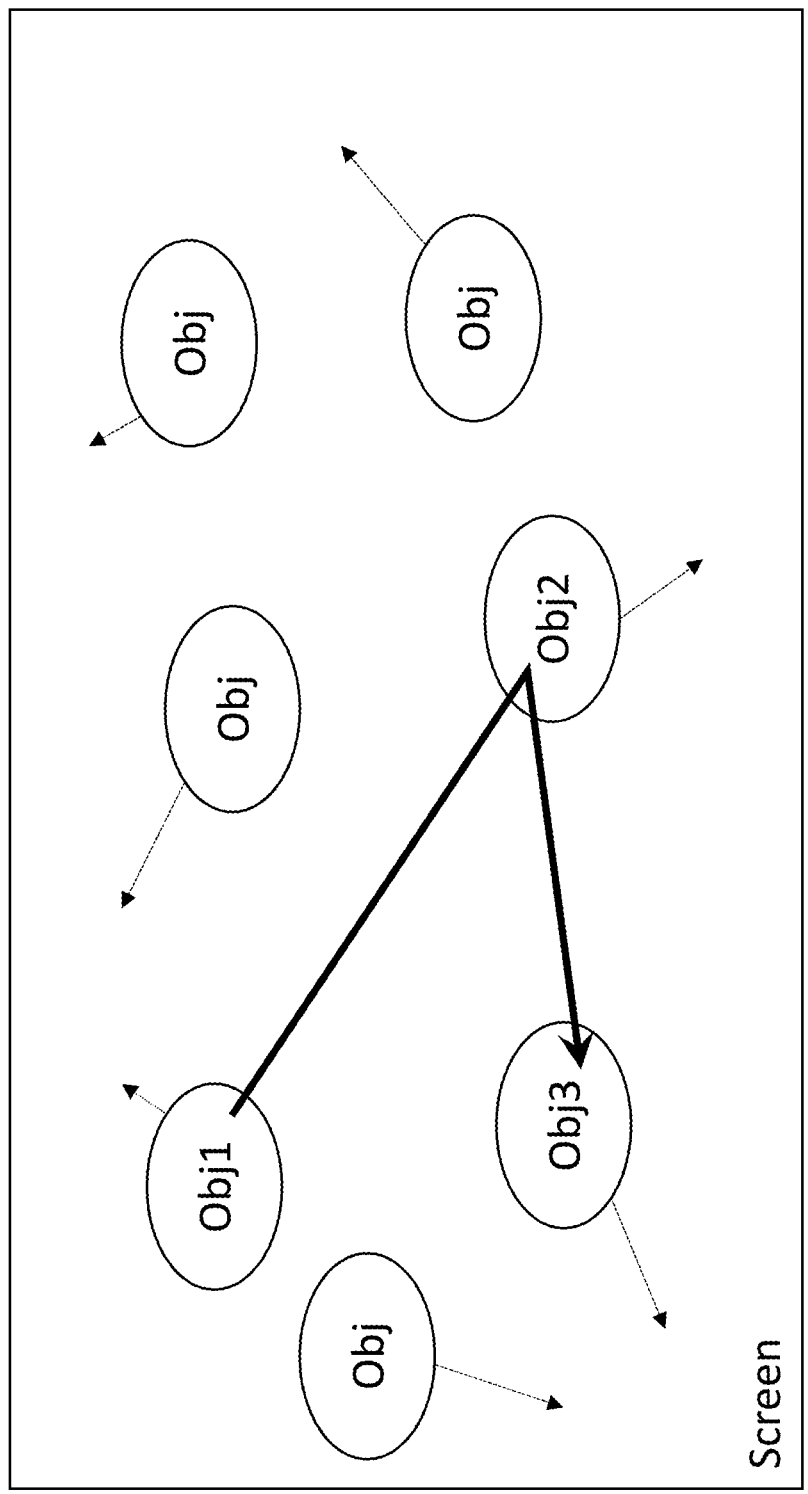
FIG. 4 illustrates a sample authentication test with images of theme and non-theme-based objects presented in an analog format to a user during authentication process, in one embodiment of the invention.
Figure 5:
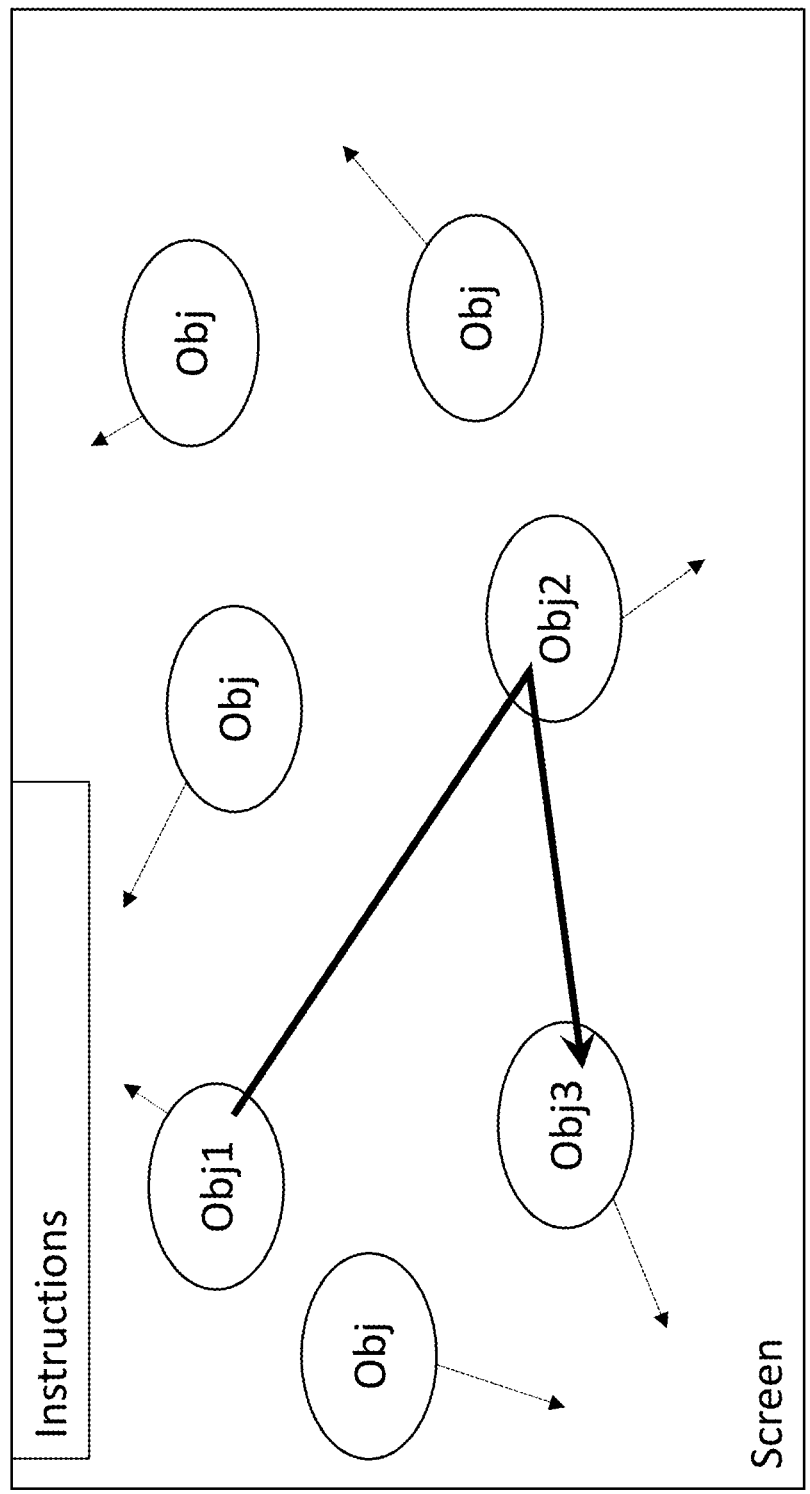
FIG. 5 illustrates a sample authentication test with images of theme and non-theme-based objects and prompts presented to a user during authentication process, in an alternate embodiment of the invention.

FIG. 4 illustrates a sample graphical depiction of a theme presented in analog format, in one embodiment of the invention, and FIG. 5 illustrates an alternate embodiment of a sample graphical depiction. As depicted in FIG. 4, various theme-based and non-theme-based objects are returned to the user device for rendering in a user interface on a screen of the user device. The theme-based objects are identified to be Obj1, Obj2, Obj3 and the non-theme-based objects are represented as just "Obj". The embodiment illustrated in FIG. 4 includes moving objects and the thin arrows provided at each object identify the direction of movement of the object in real-time. User interaction at the theme-based objects is depicted by the dark directional arrow identifying the ballistic connection between Obj1, Obj2 and Obj3. The ballistic connection also identifies the sequence of selection of the objects by the user. The user interaction at the different objects is recorded by coordinate pairs and where the screen has touch-input capability, the coordinate pairs correspond to the touch input coordinates.

FIG. 5 illustrates an embodiment that is varies from what is depicted in FIG. 4. In this embodiment, in addition to rendering the objects (both theme-based and non-theme-based objects), the screen also includes instructions directing the user to respond to a theme-based prompt. For example, the instructions may provide the sequence in which the theme-based objects presented on the screen have to be selected. Although the embodiment illustrated in FIG. 5 is provided as text box, other forms of presenting the instructions may also be employed including, but not limited to, audio prompt, haptic prompt, visual prompt, etc. User interaction in response to the prompt are recorded and used to determine the credibility score of the user, which is used to grant access to the application.

Figure 8:
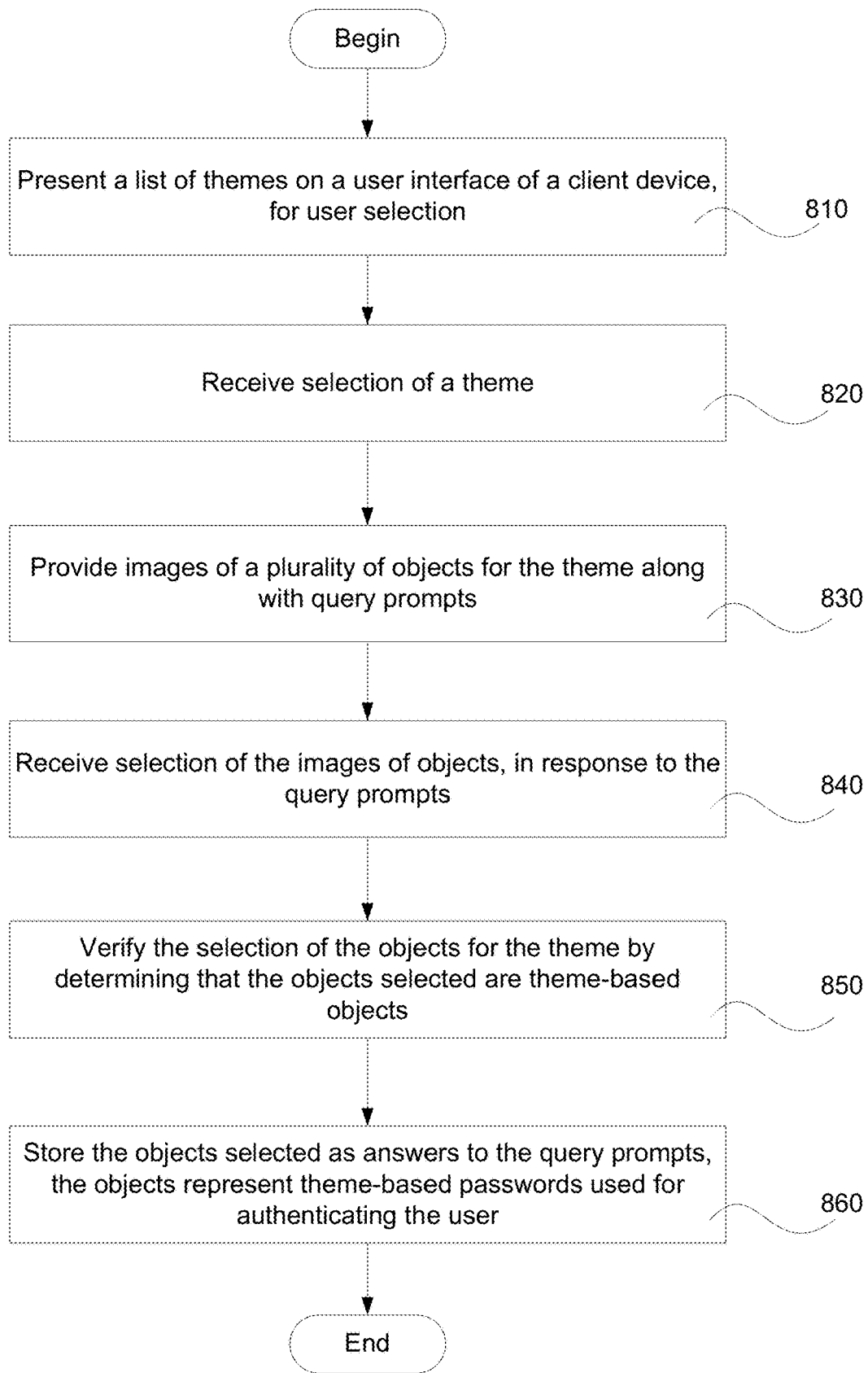
FIG. 8 illustrates operation of a method for generating a theme-based authentication used to authenticate a user in order to provide access to a sensitive digital asset, in one embodiment of the invention.

FIG. 8 illustrates operations of a method for defining a theme-based authentication for use in providing a user access to a digital asset, in one embodiment of the invention. The method begins at operation 810, when a list of themes is presented in a user interface rendered on a client device, for user selection. The list of themes may be generated by an authentication system and provided to the user. User selection of a theme from the list is received at the authentication system, as illustrated in operation 820. The authentication system then performs a test run by presenting images of a plurality of objects for the theme at the user interface along with query prompts that are appropriate for the images of objects presented, as illustrated in operation 830. The authentication system identifies a set of theme-based objects and mixes them with a set of non-theme-based objects and presents the combination of objects at the user interface. The non-theme-based objects that are included in the mix are selected so that they are closer in the subject matter to the theme-based objects so that the theme-based objects do not stand out at the user interface. Further, the number of theme-based objects and non-theme-based objects that are defined to provide sufficient misdirection for a casual observer.

User selection of one or more of the images of the objects, in response to the query prompts, is received at the authentication system, as illustrated in operation 840. The selection of the images are then verified to see if the images selected are of the objects that are related to the theme and to the query prompts, as illustrated in operation 850. In order to verify, the authentication system first analyzes the image that was selected to determine the object presented in the image. The authentication system then determines if the selected object relates to the theme. For example, the object that is selected by user interaction at the corresponding image at the user interface may be related to the theme but not related to the query prompt that is provided at the time. Similarly, the selected object may be related to the query prompt but may not be related to the theme. In such cases, the authentication system may flag the response as incorrect.

Upon successful verification of the user selection of the images of theme-based objects, the user selection is stored as answers to the query prompts for the theme, as illustrated in operation 860. These answers represent theme-based password for the theme. Subsequent to defining the theme and establishing the answers for the theme, when the user accesses an application that requires user authentication, the authentication system may present the theme-based query prompts with the images of objects (a mixture of theme-based and non-theme-based objects) for user interaction. The responses provided to the query prompts are verified against the answers stored for the theme, and when the answers match, the user is given access to a digital asset that is associated with the application.

Figure 9:
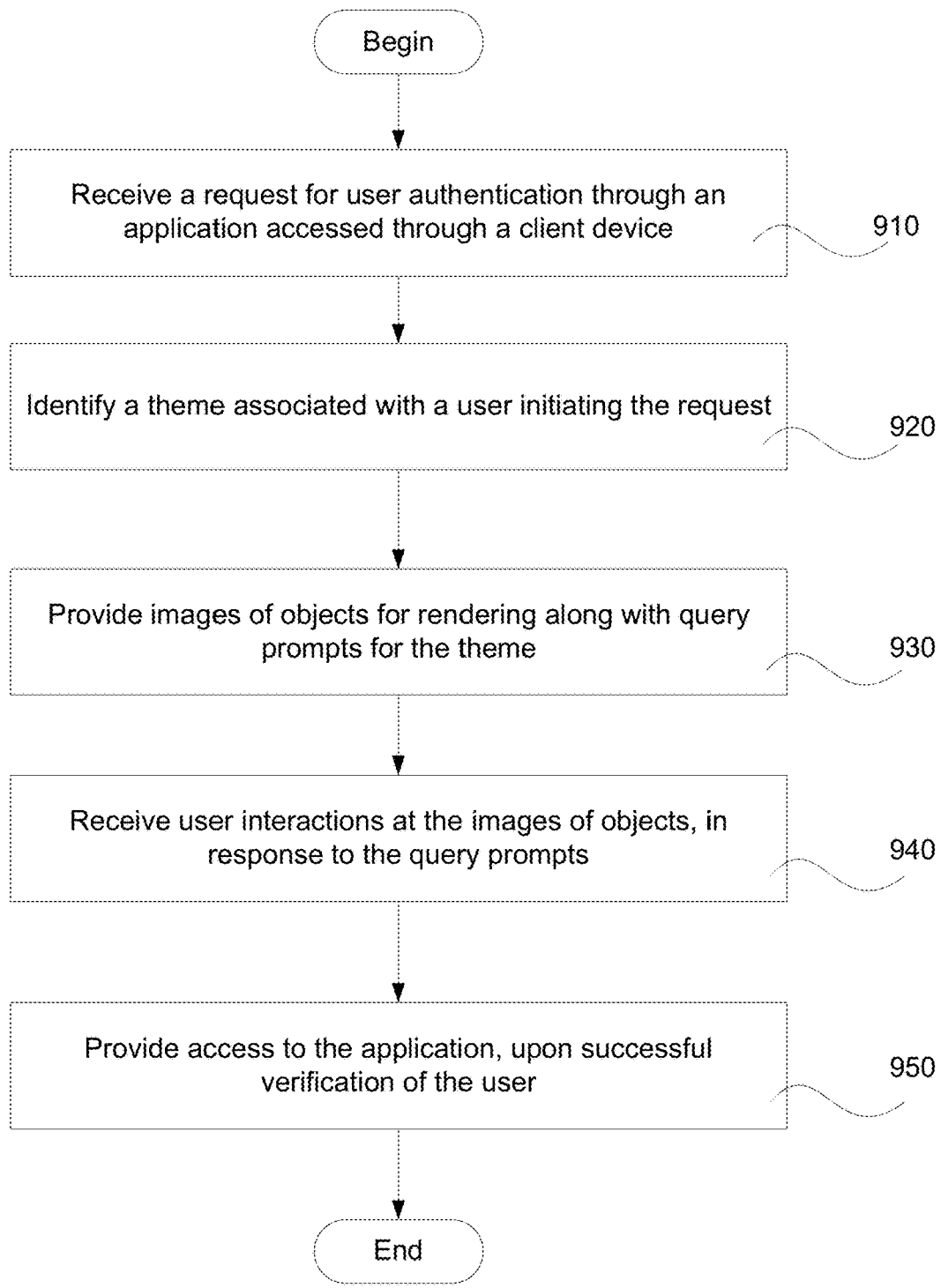
FIG. 9 illustrates operations of a method that is used to authenticate a user in order to provide access to a sensitive digital asset through an application, in one embodiment of the invention.

FIG. 9 illustrates a method for authenticating user prior to providing access to a digital asset, in one embodiment. The method begins at operation 910, when a request for user authentication is received through an application accessed through a client device. The application may be associated with a sensitive digital asset and the authentication may be needed to access the sensitive digital asset. In response to the request, the authentication system may identify a theme associated with a user that is initiating the request, as illustrated in operation 920. The theme may be selected by the user from a plurality of themes or may be created by the user by uploading pictures or images of objects and defining a theme for the uploaded pictures or images, wherein the pictures or images may be generated by the user or selected by the user from one or more sources. The theme for the user may be identified using a user identifier, user name, or any other information obtained from a user profile of the user that can be specifically used to identify the user.

Upon identifying the theme, the authentication system identifies images of objects and query prompts that are related to the objects for the theme and provide the identified objects and the relevant query prompts for presenting at the user interface of the client device, as illustrated in operation 930. The objects that are presented include a combination of the theme-based objects and non-theme-based objects. User interactions at the images of objects are received at the authentication system and verified, as illustrated in operation 940. As part of the verification, user interaction is interpreted as coordinate pairs defined for the location of the user interaction, which is then tagged with a time stamp of when the user interaction was provided at the user interface. The user interaction with the time stamp is then verified by matching the coordinate pairs of the user interaction with coordinate pairs associated with various objects for the time defined in the time stamp, using an object mapping to identify an object selected by the user interaction. If the verification is unsuccessful (i.e., the coordinate pairs associated with the user interaction does not match with any coordinate pair in the object mapping for the time defined in the time stamp), the authentication system may ignore the user interaction or may use it to adjust a credibility score computed for the user. If, on the other hand, the verification is successful (i.e., the coordinate pairs associated with the user interaction matches with a coordinate pair in the object mapping), an object corresponding to the matching coordinate pair is identified. The identified object is then verified against an answer stored for the query prompt defined for the theme. Verification is successful when the identified object matches the answer stored for the query prompt for the theme.

Upon successful verification, the authentication system provides access to the application that is used to access a digital asset, as illustrated in operation 950. Granting of the access is based on the credibility score computed for the user and based on level of credibility specified for the application. The level of credibility for the application may be defined by a developer and may be based on the sensitive nature of the digital asset. Credibility score of the user is computed based on user interactions provided at the user interface. For example, in one embodiment, if the user interaction leads to a successful matching to the answer defined for the query prompt, the credibility score of the user is incremented by a certain amount or percentage point, and when the user interaction does not match to an answer, the credibility score of the user is decremented. In other embodiments, the credibility score of the user may be defined as a function of number of matches to total number of user interactions detected at the user interface. The above ways of computing the credibility score of the user is exemplary and that other ways of computing the credibility score of the user may also be employed. After granting access to the application, the user's credibility score may be updated to the user profile, which is used when granting access to the application or a different application in response to subsequent request.

The various embodiments described herein provide a theme-based password authentication system that enables a level of abstraction making this authentication scheme both people-proof and computer-proof. This theme-based authentication scheme can be presented on a single device or may be presented on multiple devices. The prompts may be presented in textual format, audio format, haptic format, visual format, etc. The advantage of this authentication scheme is that a person that knows the theme can demonstrate their knowledge with few data points (i.e., prompt responses), whereas a third party will not be able to guess accurately since the objects on the screen at any one time could be related to hundreds or thousands of themes, each with the same level of plausibility. The authentication scheme may be made more complex by introducing language such that the theme responses are presented in different languages selected by the person that the system recognizes but the third party is not aware of. Based on security level of the Application, additional tests may be conducted to further authenticate the user and such tests may be presented on the same device where the initial test was conducted or may be on a different device of the user and may be in the same format or in a different format. The authentication scheme may also provide a captcha-replacement option, wherein the theme instructions may be placed in the same frame as the window and the test is run to validate the user is human. This option has the advantage of testing varying levels of credibility based on the theme and resulting prompts presented as a game.

With the above embodiments in mind, it should be understood that the invention may employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing.

Any of the operations described herein that form part of the invention are useful machine operations. The invention also relates to a device or an apparatus for performing these operations. The apparatus may be specially constructed for the required purposes or it may be a general-purpose computer selectively activated or configured by a computer program stored in the computer. In particular, various general purpose machines may be used with computer programs written in accordance with the teachings herein, or it may be more convenient to construct a more specialized apparatus to perform the required operations.

The invention can also be embodied as computer readable code on a computer readable medium. The computer readable medium is any data storage device that can store data, which can thereafter be read by a computer system. Examples of the computer readable medium include hard drives, network attached storage (NAS), read-only memory, random-access memory, CD-ROMs, CD-Rs, CD-RWs, magnetic tapes, and other optical and non-optical data storage devices. The computer readable medium can also be distributed over a network coupled computer systems so that the computer readable code is stored and executed in a distributed fashion.

It will be obvious, however, to one skilled in the art, that the present invention may be practiced without some or all of these specific details. In other instances, well known process operations have not been described in detail in order not to unnecessarily obscure the present invention.

Although the foregoing invention has been described in some detail for purposes of clarity of understanding, it will be apparent that certain changes and modifications can be practiced within the scope of the invention. Accordingly, the present embodiments are to be considered as illustrative and not restrictive, and the invention is not to be limited to the details given herein, but may be modified within the scope of the invention.

What is claimed is:

1. A method for authenticating a user, comprising:
   presenting a list of themes on a user interface of a client device, for user selection; receiving selection of a theme from the list of themes;
   providing images of a plurality of objects for the theme on the user interface along with query prompts, wherein the images that are presented are moving in real-time and include a combination of theme-based objects and non-theme-based objects and wherein the query prompts correspond to an attribute related to select one or more of the theme-based objects presented for user selection;
   receiving selection of the images of objects in response to the query prompts, wherein selection of image of each object is captured as a coordinate pair;
   verifying the selection of the images of objects for the theme by matching the coordinate pair captured for each selected image of an object with coordinate pairs of the plurality of objects presented at the user interface at a time of selection of the image of the object, wherein the verifying includes determining that the coordinates of the image of the object that is selected relate to theme-based object and correspond to the query prompts; and
   storing the theme-based objects selected in response to the query prompts as answers to the query prompts for the theme, the answers represent theme-based password that are used for authenticating the user during subsequent requests received from an application that requires user authentication prior to providing access to a sensitive asset,
   wherein the access to the application during subsequent requests is provided upon verifying that the selection of the images of objects from the user during subsequent requests meets at least a level of credibility defined for the application, and
   wherein operations of the method are performed by a processor of an authentication system.

2. The method of claim 1, wherein verifying the selection further includes,
   determining location of each object presented on the user interface at different time period and correlating the selection of the images to corresponding objects by matching the coordinate pair of each object captured in the selection with location of the object at the user interface at time of selection.

3. The method of claim 1, wherein the theme, the query prompts and answers to the query prompts for the user are stored locally within the authentication system or in a central repository that is accessible to a plurality of applications.

4. The method of claim 1, wherein storing the objects includes encrypting the theme, the query prompts and the answers to the query prompts for the user and storing the encrypted theme.

5. The method of claim 1, further includes,
   presenting images of objects retrieved from an object library;
   receiving user selection of a subset of the images of the objects retrieved from the object library;
   providing an option to define a new theme for the subset of the images, the new theme being associated with the subset of the images;
   identifying query prompts that are relevant for the new theme, the query prompts identified based on the subset of images; and
   storing the subset of images and query prompts for the new theme.

6. The method of claim 5, wherein providing an option to define the new theme further includes analyzing the images of objects in the object library to identify non-theme-based objects for presenting with the subset of the images when the new theme is selected.

7. The method of claim 1, further includes,
   providing an option to upload images of objects and to define a new theme for the uploaded images of objects, wherein the images of objects that are uploaded are user generated or user selected;
   identifying query prompts that are relevant for the new theme, the query prompts identified based on the uploaded images; and
   storing the uploaded images and query prompts for the new theme.

8. The method of claim 7, wherein providing the option to upload images further includes analyzing the images of objects to identify non-theme-based objects for presenting with the uploaded images.

9. A method for authenticating a user, comprising:
   receiving a request for user authentication of the user from a client device, the request being provided through an application accessed from the client device that requires user authentication of the user in order to provide access to a sensitive asset; identifying a theme associated with the user;
   providing images of objects for rendering on a user interface at a display screen of the client device and query prompts for rendering at the client device, wherein the query prompts include a first portion and a second portion, wherein the first portion of the query prompts is presented in a first format and a second portion of the query prompts is presented in a second format, the first format being different from the second format, the images of objects that are provided include images of theme-based objects and non-theme-based objects that are moving in real-time and the query prompts correspond to an attribute related to select one or more of the theme-based objects for the theme rendered for user selection;

receiving user interactions at select ones of the images of objects presented at the client device as coordinate pairs, in response to the query prompts, wherein the user interactions are verified against corresponding answers provided by the user for the query prompts that are associated with the theme, the answers representing a theme-based password for authenticating the user, wherein the verification includes matching coordinate pairs of the images of the select ones of the objects where user interactions are received against corresponding coordinate pairs of the objects presented at the user interface at a time the user interactions were received at the images of the select ones of objects; and providing access to the application, upon successful authentication of the user, wherein the successful authentication of the user includes verifying the user interactions at least meet a level of credibility defined for the application, wherein operations of the method are performed by a processor of an authentication system.

10. The method of claim 9, further includes receiving a request for additional authentication of the user, the additional authentication requested when the user interactions does not meet the level of credibility defined for the application.

11. The method of claim 10, wherein the query prompts for the additional authentication are provided in a different format than the query prompts for the user authentication.

12. The method of claim 10, wherein the request for additional authentication includes a device identifier of a second client device on which the additional authentication is to be provided, wherein the second client device is different from the client device used for authenticating the user.

13. The method of claim 9, wherein providing query prompts further includes,
querying a user profile of the user to identify a device identifier of a second client device on which the second portion of the query prompt is to be presented; and
providing a token to automatically establish communication connection with the second client device for authenticating the user, wherein the second client device is different from the client device.

14. The method of claim 9, wherein the query prompts are provided in an audio format, or a text format, or a haptic format, or a visual format, or any combinations thereof.

15. The method of claim 9, wherein verifying user interactions further includes,
evaluating the user interactions provided in response to the query prompts by comparing the user interactions for the query prompts with corresponding answers stored for the theme, the evaluation used in computing a credibility score for the user; and
granting access to the application based on the credibility score meeting the level of credibility defined for the application.

16. The method of claim 9, further includes providing an option to define a new theme for authenticating the user, wherein defining the new theme includes,
providing an option to upload images of objects and defining the new theme for the uploaded images, wherein the uploaded images are user defined or user selected.

17. The method of claim 16, wherein the uploaded images of objects are in video format that is captured when the objects are moving.

18. The method of claim 9, wherein verifying user interactions further includes,
identifying coordinates associated with a user interaction provided at the user interface in response to a query prompt, the coordinates tagged with a time stamp of the user interaction;
determining an object associated with the coordinates by matching the coordinates and the time stamp associated with the user interface to the object using an object mapping generated for positions of the objects at different times; and
verifying the object associated with the coordinates to an answer provided for the theme, wherein the answer identifying an object representing the theme-based password.

19. An authentication system for authenticating a user for an application used to access a digital asset, the authentication system implemented in a computing device, the computing device includes a processor to execute code of the authentication system and a memory to store the code of the authentication system, wherein the code of the authentication system comprising:
an enrollment code that is configured to enroll a user into the authentication system by allowing the user to select a theme or define a theme for using during an authentication process, the enrollment module identifying query prompts that are specific to the theme for the user;
a playback code that is configured to authenticate the user by,
presenting objects and a query prompt for the theme and receiving a user response to the query prompt, the user response associated with a time stamp, wherein the objects presented are moving in real-time and include theme-based and non-theme based objects and wherein the query prompt corresponds to an attribute related to select one or more of the theme-based objects presented for user selection;
tracking the objects to determine location of the objects at different time periods, wherein the location of the objects identified by coordinate pairs; and
correlating the user response received at a specific time to object mapping that provides location of the objects at different time periods to identify an object that matches the coordinate pair provided in the user response, wherein the object mapping is performed by matching the coordinate pair of the object provided in the user response with corresponding coordinate pairs of the objects presented to the user at different times;
an evaluation code configured to,
evaluate the user response to answers provided for the theme;
compute a credibility score for the user based on the user response; and
provide access to the application when the computed credibility score of the user at least meets a level of credibility defined for the application.

20. The method of claim 1, wherein verifying selection of the images further includes,
evaluating the selection of the images, in response to the query prompts, by comparing the selection with corresponding answers stored for the theme, the evaluation used in computing a credibility score for the user; and granting access to the application upon verifying that the credibility score at least meets the level of credibility defined for the application.

\* \* \* \* \*